March 29, 1949.  A. S. AHLBOM  2,465,779
MEANS FOR HEATING VISCOUS LIQUIDS
IN SHIP'S TANKS Filed April 1, 1947　　　　　　　　　　　　　　3 Sheets-Sheet 1

INVENTOR.
Anders S. Ahlbom
BY
ATTORNEYS.

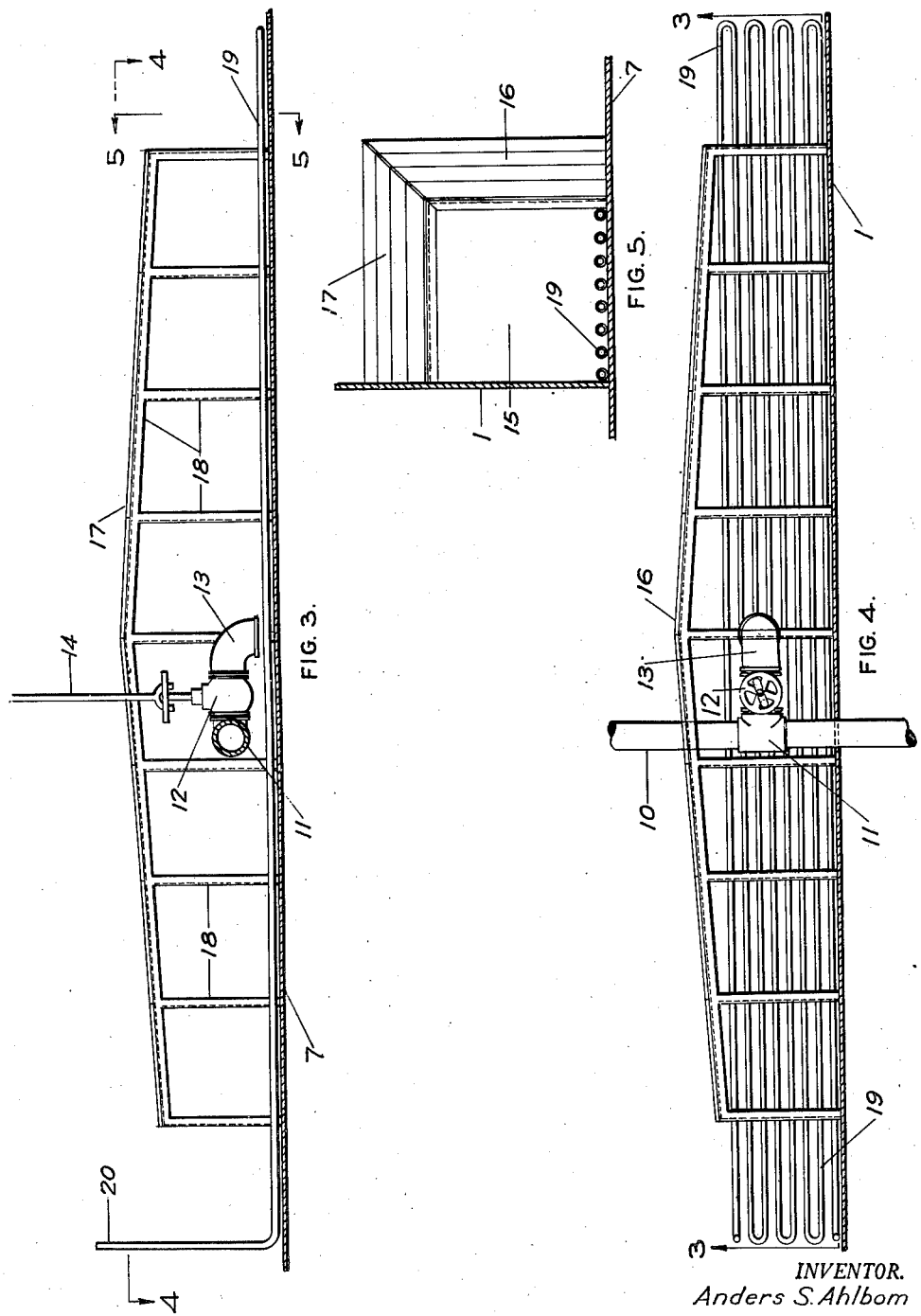

March 29, 1949.

A. S. AHLBOM 2,465,779

MEANS FOR HEATING VISCOUS LIQUIDS IN SHIP'S TANKS

Filed April 1, 1947

INVENTOR.
Anders S. Ahlbom
BY
ATTORNEYS.

Patented Mar. 29, 1949

2,465,779

UNITED STATES PATENT OFFICE 2,465,779

MEANS FOR HEATING VISCOUS LIQUIDS IN SHIPS' TANKS

Anders S. Ahlbom, Port Arthur, Tex.

Application April 1, 1947, Serial No. 738,684

18 Claims. (Cl. 114—74)

1

The invention concerns means for heating liquid cargo and bunker fuel in ships' tanks preparatory to pumping out, and is intended to supplement or to replace entirely heating systems which have been used heretofore for that purpose.

Certain viscous liquids, such as residual oils and asphaltic materials, although relatively fluid at atmospheric temperatures, cannot be pumped without first heating them. The usual practice is to provide steam coils in the bottoms of ships' tanks and to pass live steam thru the coils to heat the contents of the tank. Temperatures as high as 300° F., for example, may be required. Due to the large volumes involved and the dissipation of heat thru the walls of the tank it is usually necessary to heat the contents of a tank for two or three days in order to bring the temperature thereof up to the point necessary to permit the material to be pumped, and thereafter to continue heating while the tank is being pumped out. A large part of the heating is ordinarily done at sea.

It is an object of the invention to effect a saving in time and fuel required to heat the contents of ships' tanks preparatory to pumping out.

The invention contemplates providing a steam heated tunnel adjacent the pumping out connection in each tank and running port and starboard, and directing the liquid being pumped thru the tunnel in order to heat it sufficiently to enable it to be handled by the pumps. This arrangement makes it unnecessary to heat the entire tank. Optionally the contents of the tank may be first heated to an intermediate temperature by means of conventional heating equipment and thereafter heated to a final pumping temperature by use of the apparatus described herein.

The invention will be understood by referring to the following description and the accompanying drawing, in which:

Fig. 3 is an enlarged view in elevation taken on the line 3—3 of Fig. 4 showing one form of the invention in which the heating tunnel is rectangular in cross section.

Fig. 4 is a plan view taken on the line 4—4 of Fig. 3 showing the tunnel as viewed from the top thereof with the cover plates removed.

Fig. 5 is an elevation taken on the line 5—5 of Fig. 3 showing the tunnel as viewed from the inlet end thereof.

2

Figure 10:
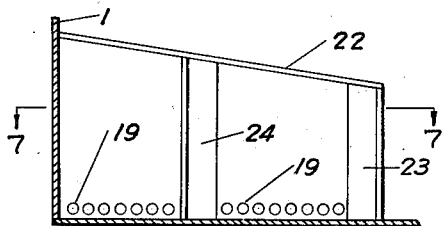
Figure 7:
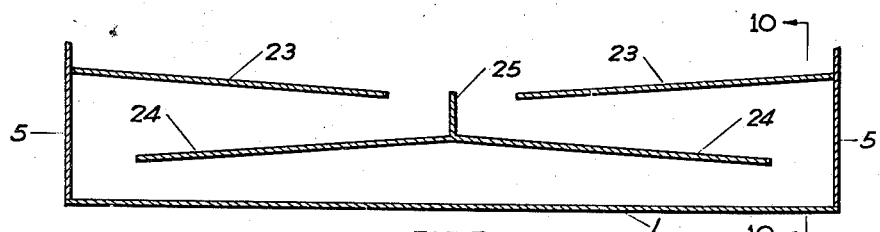

Fig. 7 is a plan view taken on the line 7—7 of Fig. 10 showing a third form of the invention in which the heating tunnel is divided longitudinally by baffles and in which the top of the tunnel slants downwardly toward the forward end of the tank.

Figure 8:
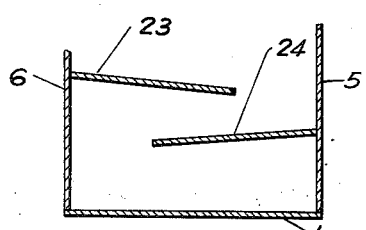

Fig. 8 is similar to Fig. 7 but shows the invention as applied to a wing tank rather than a center tank.

Figure 9:
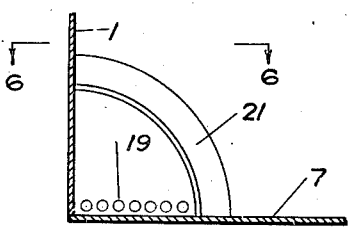
Figure 6:
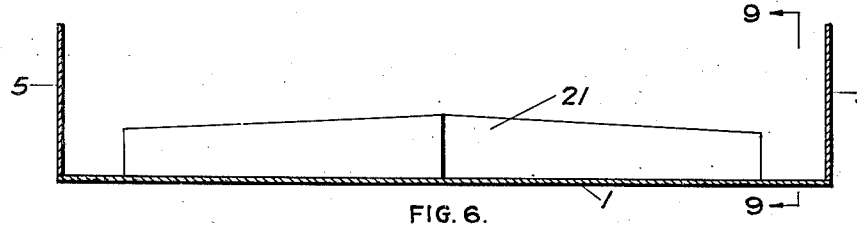
Fig. 6 is a plan view taken on the line 6—6 of Fig. 9 showing a second form of the invention in which the top and one side of the heating tunnel are curved in cross section.

Fig. 9 is an elevation taken on the line 9—9 of Fig. 6 showing an end view of the tunnel having the curved top and side.

Fig. 10 is an elevation taken on the line 10—10 of Fig. 7 showing an end view of a two-pass tunnel.

Figure 1:
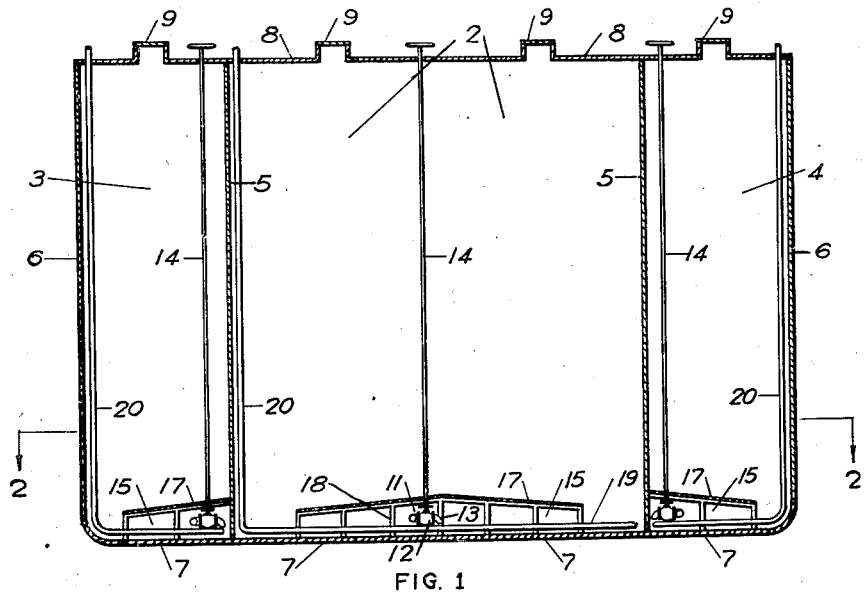
Fig. 1 is an elevation taken on the line 1—1 of Fig. 2 showing in cross section a portion of the cargo space of a tanker.
Figure 2:
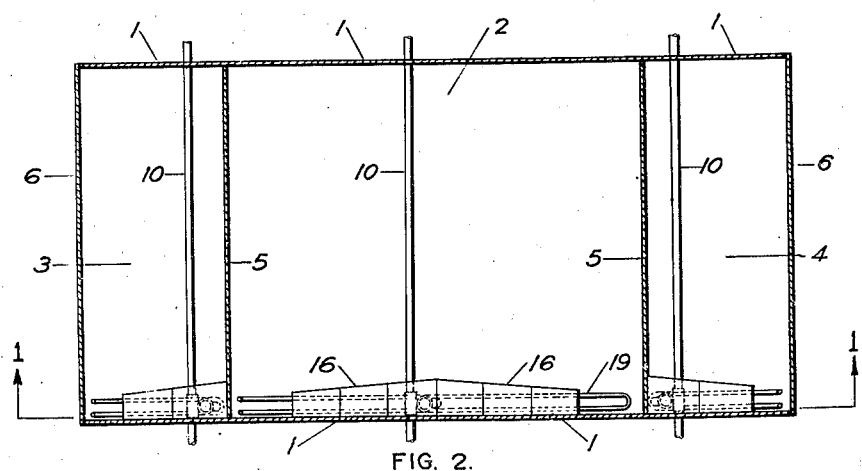
Fig. 2 is a plan view taken on the line 2—2 of Fig. 1.

Referring to Figs. 1 and 2 of the drawing, the cargo space of the vessel is divided by transverse bulkheads 1, two of which are shown, into a series of tank groups, each group of the series consisting of a center tank 2, a port side wing tank 3 and a starboard side wing tank 4. The center tank 2 and the wing tanks 3 and 4 occupy substantially all of the space in the ship between the transverse bulkheads 1 and are separated from each other by longitudinal bulkheads 5. The outer walls 6 of the wing tanks 3 and 4 are adjacent the sides of the ship and the tank bottoms 7 are adjacent the bottom of the ship. The numeral 8 indicates the deck above the top of the tanks, and the numeral 9 indicates the hatches.

Pumping out lines 10, which run fore and aft and extend substantially the entire length of the ship, are provided for pumping out the center tanks 2, the port side wing tanks 3 and the starboard side wing tanks 4, respectively. The pumping out lines 10 are positioned adjacent the bottom of the ship and are provided with connections for pumping out each of the tanks communicating therewith. Each of the pumping out connections consists of a T 11, a gate valve 12 and a down-turned L 13. Reach rods 14 are provided for manipulating the gate valves 12 from the deck 8. The stern of the ship ordinarily lies lower in the water than the bow, and for that reason the pumping out connections are positioned on the aft side of the respective tanks 2, 3 and 4, adjacent the aft bulkhead 1. In the center tanks 2 the pumping out connections are positioned in the middle of the tank, while in the wing tanks 3 and 4 they are positioned adjacent the longitudinal bulkheads 5.

Referring to Figs. 1 to 5, inclusive, a heating tunnel 15 is provided on the aft side of each of the tanks 2, 3 and 4. The tunnel 15 encloses the pumping out connection and runs port and starboard adjacent the aft bulkhead 1 and the tank bottom 7. In the center tanks 2 the tunnel 15 is formed in two sections, each of which extends inwardly toward the middle of the tank from a point near one of the longitudinal bulkheads 5. In the wing tanks 3 and 4 the tunnel 15 extends inwardly toward the longitudinal bulkhead 5 from a point near the outer wall 6.

Each of the tunnels 15 is rectangular in cross section and is wider at its outlet adjacent the pumping out connection than at its inlet. The top and forward side of the tunnel slant downwardly and aft, respectively, toward the inlet end of the tunnel. This arrangement permits the contents of the tank to flow by gravity toward the inlet end of the tunnel.

The aft bulkhead 1 forms one side of the tunnel 15 and the tank bottom 7 is also the bottom of the tunnel 15. The forward side of the tunnel 15 and the top thereof are formed by side plates 16 and cover plates 17, respectively, the plates 16 and 17 being secured to a supporting frame 18. The cover plates 17 are preferably removable, and may be secured to the frame 18 by removable fastenings (not shown).

The frame 18, which supports the side plates 16 and the cover plates 17, and which together with the plates 16 and 17 forms the top and one side of the tunnel 15, may be made of angle iron, for example, and may be secured by welding to the aft bulkhead 1 and the tank bottom 7.

A steam coil 19, comprising a number of pipes arranged parallel to each other and connected at their ends, is positioned within the tunnel 15 adjacent the tank bottom 7, the several pipes extending outwardly beyond the ends of the tunnel 15. The ends of the steam coil 19 are connected to steam pipes 20 which extend upwardly above the deck 8. The arrangement of the steam coil may be varied as desired, and any number of pipes or rows of pipes may be used. If desired the entire space within the tunnel 15 may be filled with steam pipes.

Temperature regulators (not shown) may be used to control the flow of steam thru the steam coil 19. The pumping rate and the amount of steam used may be regulated to control the temperature of the liquid leaving the tank.

In the second form of the invention illustrated in Figs. 6 and 9 the heating tunnel is curved in cross section and is formed by curved members 21. The curved members 21 are tapered from end to end, being wider at the outlet end of the tunnel adjacent the pumping out connection than at the inlet end. The curved members 21 may be formed in sections, each of which may be removably secured to the aft bulkhead 1 and the tank bottom 7.

A two-pass heating tunnel is shown in Figs. 7, 8 and 10, the heating tunnel running port and starboard the entire width of the tank. The top 22 of the trunnel slants downwardly toward the forward end of the tank, and the side plates 23 slant aft toward the inlet of the tunnel. This arrangement permits the contents of the tank to gravitate toward the inlet of the tunnel. The baffles 24, which divide the tunnel longitudinally, likewise slant aft to permit gravity flow thru the tunnel. As shown in Fig. 7, which concerns the application of the invention to the center tanks 2, the inlet of the heating tunnel is located near the middle of the tank and the tunnel is divided by a central partition 25 into two sections, one section running to port and return and the other section running to starboard and return.

The invention may be modified in various ways without departing from the spirit and scope thereof.

I claim:

1. In a ship's tank having an aft wall extending crosswise with respect to the ship and a pumping out connection in the bottom of the tank adjacent the aft wall, means for heating the contents of the tank preparatory to pumping out comprising a tunnel positioned in the bottom of the tank adjacent the aft wall, the arrangement being such that the contents of the tank are caused to pass thru the tunnel prior to withdrawal from the tank, and means for heating the contents of the tank during passage thru the tunnel.

2. In a ship's tank having an aft wall extending crosswise with respect to the ship and a pumping out connection in the bottom of the tank adjacent the aft wall, means for heating the contents of the tank preparatory to pumping out comprising a tunnel positioned in the bottom of the tank adjacent the aft wall, the aft wall forming one side of the tunnel and the bottom of the tank being the bottom of the tunnel, the arrangement being such that the contents of the tank are caused to pass thru the tunnel prior to withdrawal from the tank, and means for heating the contents of the tank during passage thru the tunnel.

3. In a ship's tank having an aft wall extending crosswise with respect to the ship and a pumping out connection in the bottom of the tank adjacent the aft wall, means for heating the contents of the tank preparatory to pumping out comprising a tunnel enclosing the pumping out connection and positioned in the bottom of the tank adjacent the aft wall, the arrangement being such that the contents of the tank are caused to pass thru the tunnel prior to withdrawal from the tank, and means for heating the contents of the tank during passage thru the tunnel.

4. In a ship's tank having an aft wall extending crosswise with respect to the ship and a pumping out connection in the bottom of the tank adjacent the aft wall, means for heating the contents of the tank preparatory to pumping out comprising a tunnel enclosing the pumping out connection and positioned in the bottom of the tank adjacent the aft wall, the aft wall forming one side of the tunnel and the bottom of the tank being the bottom of the tunnel, the arrangement being such that the contents of the tank are caused to pass thru the tunnel prior to withdrawal from the tank, and means for heating the contents of the tank during passage thru the tunnel.

5. In a tank ship having center tanks and wing tanks, a center tank having an aft wall extending crosswise with respect to the ship and a pumping out connection in the bottom of the tank adjacent the aft wall, the pumping out connection being located in the middle of the tank, and means for heating the contents of the tank preparatory to pumping out comprising a tunnel enclosing the pumping out connection and positioned in the bottom of the tank adjacent the aft wall, the aft wall forming one side of the tunnel and the bottom of the tank being the bottom of the tunnel, the arrangement being such that the contents of the tank are caused to pass thru the tunnel prior to withdrawal from the tank, the tunnel being formed in two sections each of which extends inwardly toward the middle of the tank from a point near one side thereof, and means for heating the contents of the tank during passage thru the tunnel.

6. In a tank ship having center tanks and wing tanks, a wing tank having an aft wall extending crosswise with respect to the ship, a longitudinal bulkhead separating the wing tank from a center tank and a pumping out connection in the bottom of the tank adjacent the aft wall, the pumping out connection being located on one side of the tank adjacent the longitudinal bulkhead, and means for heating the contents of the tank preparatory to pumping out comprising a tunnel enclosing the pumping out connection and positioned in the bottom of the tank adjacent the aft wall, the aft wall forming one side of the tunnel and the bottom of the tank being the bottom of the tunnel, the arrangement being such that the contents of the tank are caused to pass thru the tunnel prior to withdrawal from the tank, the tunnel extending inwardly toward the longitudinal bulkhead from a point near the opposite side of the tank, and means for heating the contents of the tank during passage thru the tunnel.

7. In a tank ship having center tanks and wing tanks, a center tank having an aft wall extending crosswise with respect to the ship and a pumping out connection in the bottom of the tank adjacent the aft wall, the pumping out connection being located in the middle of the tank, and means for heating the contents of the tank preparatory to pumping out comprising a tunnel enclosing the pumping out connection and positioned in the bottom of the tank adjacent the aft wall, the aft wall forming one side of the tunnel and the bottom of the tank being the bottom of the tunnel, the arrangement being such that the contents of the tank are caused to pass thru the tunnel prior to withdrawal from the tank, the tunnel being formed in two sections each of which extends outwardly from the middle of the tank to one side thereof, each section of the tunnel being divided longitudinally by one or more baffles adapted to cause the contents of the tank to make a plurality of passes thru the tunnel, the direction of flow being reversed at the end of each pass, and means for heating the contents of the tank during passage thru the tunnel.

8. In a tank ship having center tanks and wing tanks, a wing tank having an aft wall extending crosswise with respect to the ship, a longitudinal bulkhead separating the wing tank from a center tank and a pumping out connection in the bottom of the tank adjacent the aft wall, the pumping out connection being located on one side of the tank adjacent the longitudinal bulkhead, and means for heating the contents of the tank preparatory to pumping out comprising a tunnel enclosing the pumping out connection and positioned in the bottom of the tank adjacent the aft wall, the aft wall forming one side of the tunnel and the bottom of the tank being the bottom of the tunnel, the arrangement being such that the contents of the tank are caused to pass thru the tunnel prior to withdrawal from the tank, the tunnel extending outwardly from the longitudinal bulkhead to the opposite side of the tank and being divided longitudinally by one or more baffles adapted to cause the contents of the tank to make a plurality of passes thru the tunnel, the direction of flow being reversed at the end of each pass, and means for heating the contents of the tank during passage thru the tunnel.

9. In a ship's tank having an aft wall extending crosswise with respect to the ship and a pumping out connection in the bottom of the tank adjacent the aft wall, means for heating the contents of the tank preparatory to pumping out comprising a tunnel enclosing the pumping out connection and positioned in the bottom of the tank adjacent the aft wall, the aft wall forming one side of the tunnel and the bottom of the tank being the bottom of the tunnel, the arrangement being such that the contents of the tank are caused to pass thru the tunnel prior to withdrawal from the tank, the tunnel being wider at its outlet adjacent the pumping out connection than at its inlet, and means for heating the contents of the tank during passage thru the tunnel.

10. In a ship's tank having an aft wall extending crosswise with respect to the ship and a pumping out connection in the bottom of the tank adjacent the aft wall, means for heating the contents of the tank preparatory to pumping out comprising a tunnel enclosing the pumping out connection and positioned in the bottom of the tank adjacent the aft wall, the aft wall forming one side of the tunnel and the bottom of the tank being the bottom of the tunnel, the arrangement being such that the contents of the tank are caused to pass thru the tunnel prior to withdrawal from the tank, the top and forward side of the tunnel slanting downwardly and aft, respectively, toward the inlet of the tunnel to permit contents of the tank to flow by gravity toward the inlet, and means for heating the contents of the tank during passage thru the tunnel.

11. In a ship's tank having an aft wall extending crosswise with respect to the ship and a pumping out connection in the bottom of the tank adjacent the aft wall, means for heating the contents of the tank preparatory to pumping out comprising a tunnel enclosing the pumping out connection and positioned in the bottom of the tank adjacent the aft wall, the aft wall forming one side of the tunnel and the bottom of the tank being the bottom of the tunnel, the arrangement being such that the contents of the tank are caused to pass thru the tunnel prior to withdrawal from the tank, the tunnel being rectangular in cross section and the top and forward side of the tunnel slanting downwardly and aft, respectively, toward the inlet of the tunnel to permit contents of the tank to flow by gravity toward the inlet, and means for heating the contents of the tank during passage thru the tunnel.

12. In a ship's tank having an aft wall extending crosswise with respect to the ship and a pumping out connection in the bottom of the tank adjacent the aft wall, means for heating the contents of the tank preparatory to pumping out comprising a tunnel enclosing the pumping out connection and positioned in the bottom of the tank adjacent the aft wall, the aft wall forming one side of the tunnel and the bottom of the tank being the bottom of the tunnel, the arrangement being such that the contents of the tank are caused to pass thru the tunnel prior to withdrawal from the tank, the tunnel being rectangular in cross section and the top and forward side of the tunnel slanting downwardly and aft, respectively, toward the inlet of the tunnel to permit contents of the tank to flow by gravity toward the inlet, the top and forward side of the tunnel being formed by cover plates and side plates secured to a supporting frame and at least the cover plates being removable, and means for heating the contents of the tank during passage thru the tunnel.

13. In a ship's tank having an aft wall extending crosswise with respect to the ship and a pumping out connection in the bottom of the tank adjacent the aft wall, means for heating the contents of the tank preparatory to pumping out comprising a tunnel enclosing the pumping out connection and positioned in the bottom of the tank adjacent the aft wall, the aft wall forming one side of the tunnel and the bottom of the tank being the bottom of the tunnel, the arrangement being such that the contents of the tank are caused to pass thru the tunnel prior to withdrawal from the tank, the top and forward side of the tunnel being curved in cross section and slanting downwardly and aft toward the inlet of the tunnel to permit contents of the tank to flow by gravity toward the inlet, and means for heating the contents of the tank during passage thru the tunnel.

14. In a ship's tank having an aft wall extending crosswise with respect to the ship and a pumping out connection in the bottom of the tank adjacent the aft wall, means for heating the contents of the tank preparatory to pumping out comprising a tunnel enclosing the pumping out connection and positioned in the bottom of the tank adjacent the aft wall, the aft wall forming one side of the tunnel and the bottom of the tank being the bottom of the tunnel, the arrangement being such that the contents of the tank are caused to pass thru the tunnel prior to withdrawal from the tank, the top and forward side of the tunnel being curved in cross section and slanting downwardly and aft toward the inlet of the tunnel to permit contents of the tank to flow by gravity toward the inlet, the top and forward side of the tunnel being continuous and being formed in sections removably secured to the aft wall and the tank bottom, and means for heating the contents of the tank during passage thru the tunnel.

15. In a ship's tank having an aft wall extending crosswise with respect to the ship and a pumping out connection in the bottom of the tank adjacent the aft wall, means for heating the contents of the tank preparatory to pumping out comprising a tunnel enclosing the pumping out connection and positioned in the bottom of the tank adjacent the aft wall, the aft wall forming one side of the tunnel and the bottom of the tank being the bottom of the tunnel, the arrangement being such that the contents of the tank are caused to pass thru the tunnel prior to withdrawal from the tank, the top of the tunnel slanting downwardly toward the forward end of the tank and the forward side of the tunnel slanting aft toward the inlet of the tunnel to permit contents of the tank to flow by gravity toward the inlet, and means for heating the contents of the tank during passage thru the tunnel.

16. In a ship's tank having an aft wall extending crosswise with respect to the ship and a pumping out connection in the bottom of the tank adjacent the aft wall, means for heating the contents of the tank preparatory to pumping out comprising a tunnel enclosing the pumping out connection and positioned in the bottom of the tank adjacent the aft wall, the aft wall forming one side of the tunnel and the bottom of the tank being the bottom of the tunnel, the arrangement being such that the contents of the tank are caused to pass thru the tunnel prior to withdrawal from the tank, the top of the tunnel slanting downwardly toward the forward end of the tank and the forward side of the tunnel slanting aft toward the inlet of the tunnel to permit contents of the tank to flow by gravity toward the inlet, the top and forward side of the tunnel being formed by cover plates and side plates secured to a supporting frame and at least the cover plates being removable, and means for heating the contents of the tank during passage thru the tunnel.

17. In a ship's tank having an aft wall extending crosswise with respect to the ship and a pumping out connection in the bottom of the tank adjacent the aft wall, means for heating the contents of the tank preparatory to pumping out comprising a tunnel enclosing the pumping out connection and positioned in the bottom of the tank adjacent the aft wall, the aft wall forming one side of the tunnel and the bottom of the tank being the bottom of the tunnel, the arrangement being such that the contents of the tank are caused to pass thru the tunnel prior to withdrawal from the tank, the top of the tunnel slanting downwardly toward the forward end of the tank and the forward side of the tunnel slanting aft toward the inlet of the tunnel to permit contents of the tank to flow by gravity toward the inlet, the tunnel being divided longitudinally by a baffle adapted to cause the contents of the tank to make two passes thru the tunnel, the direction of flow being reversed at the end of the first pass and the baffle slanting aft to permit gravity flow thru the tunnel, and means for heating the contents of the tank during passage thru the tunnel.

18. In a ship's tank having an aft wall extending crosswise with respect to the ship and a pumping out connection in the bottom of the tank adjacent the aft wall, means for heating the contents of the tank preparatory to pumping out comprising a tunnel enclosing the pumping out connection and positioned in the bottom of the tank adjacent the aft wall, the aft wall forming one side of the tunnel and the bottom of the tank being the bottom of the tunnel, the arrangement being such that the contents of the tank are caused to pass thru the tunnel prior to withdrawal from the tank, the top of the tunnel slanting slanting downwardly toward the forward end of the tank and the forward side of the tunnel slanting aft toward the inlet of the tunnel to permit contents of the tank to flow by gravity toward the inlet, the tunnel being divided longtudinally by one or more baffles adapted to cause the contents of the tank to make a plurality of passes thru the tunnel, the direction of flow being reversed at the end of each pass and the baffles slanting aft to permit gravity flow thru the tunnel, and means for heating the contents of the tank during passage thru the tunnel.

ANDERS S. AHLBOM.

REFERENCES CITED

The following references are of record in the file of this patent:

UNITED STATES PATENTS

| Number | Name | Date |
|---|---|---|
| 2,120,286 | Macdonald | June 14, 1938 |
| 2,346,505 | Preuss | Apr. 11, 1944 |

FOREIGN PATENTS

| Number | Country | Date |
|---|---|---|
| 4,685 | Great Britain | Apr. 3, 1886 |
| 115,477 | Great Britain | May 8, 1918 |